US006877321B2

(12) United States Patent
Retzlaff et al.

(10) Patent No.: US 6,877,321 B2
(45) Date of Patent: Apr. 12, 2005

(54) METHOD AND SYSTEM FOR REDUCING TURBINE EXHAUST TURBULENCE

(75) Inventors: Klaus M. Retzlaff, Schenectady, NY (US); Daniel Mark Brown, Altamont, NY (US)

(73) Assignee: General Electric Company, Schenectady, NY (US)

( * ) Notice: Subject to any disclaimer, the term of this patent is extended or adjusted under 35 U.S.C. 154(b) by 88 days.

(21) Appl. No.: 10/249,319

(22) Filed: Mar. 31, 2003

(65) Prior Publication Data

US 2004/0187472 A1 Sep. 30, 2004

(51) Int. Cl.[7] .................................................. F02C 7/00

(52) U.S. Cl. ........................... 60/779; 60/39.091; 415/9

(58) Field of Search ............................ 60/39.091–39.5, 60/779; 415/9

(56) References Cited

U.S. PATENT DOCUMENTS 4,825,644 A 5/1989 Bubello et al.

5,222,862 A * 6/1993 Groenendaal et al. .......... 415/9

* cited by examiner

*Primary Examiner*—Louis J. Casaregola

(74) *Attorney, Agent, or Firm*—Armstrong Teasdale LLP

(57) ABSTRACT

A method for assembling a turbine engine including an exhaust diffuser extending aftward from exhaust casing, wherein the method includes coupling a relief diaphragm to the exhaust diffuser and coupling a guide system to the exhaust diffuser such that the guide system is radially inward from the relief diaphragm and defines at least a portion of the exhaust flow path through the exhaust diffuser.

17 Claims, 3 Drawing Sheets

METHOD AND SYSTEM FOR REDUCING TURBINE EXHAUST TURBULENCE

BACKGROUND OF INVENTION

This invention relates generally to rotary machines and, more particularly, to a method and a system for reducing internal exhaust turbulence from rotary machines.

Steam and gas turbines are used, among other purposes, to power electric generators. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Some known steam turbines are coupled to a condenser. Under normal operating conditions, an engine casing channels exhaust flow axially through the engine to an exhaust diffuser and then the condenser condenses the exhaust. Know casings include cut away ducts which include relief diaphragms. Under abnormal operating conditions, the condenser can fail and cause a rapid pressure increase in the exhaust diffuser. Under this condition, the relief diaphragm is designed to rupture and release steam outside and facilitate preventing damage to the turbine.

An operating efficiency of the turbine depends at least in part on flow dynamics within the turbine, and as such, engine efficiency may be limited by the geometry of aerodynamic components. More specifically, changing the geometric shape of certain aerodynamic components, such as exhaust diffusers, may facilitate reducing flow variations and increasing engine efficiency. However, because relief diaphragms are adjacent the exhaust flow, the cut away ducts may induce turbulence into the exhaust flow path. Such turbulence may cause flow losses which may decrease turbine efficiency.

SUMMARY OF INVENTION

In one aspect, a method is provided for assembling a turbine engine including an exhaust diffuser extending aftward from exhaust casing, wherein the method includes coupling a relief diaphragm to the exhaust diffuser and coupling a guide system to the exhaust diffuser such that the guide system is radially inward from the relief diaphragm and defines at least a portion of the exhaust flow path through the exhaust diffuser.

In another aspect, a turbine engine is provided, wherein the engine includes an exhaust casing defining a portion of an exhaust flow path therethrough, an exhaust diffuser coupled to the exhaust casing, a relief diaphragm coupled to the exhaust diffuser, and a guide system coupled to the exhaust diffuser such that the guide system is radially inward from the relief diaphragm and between the relief diaphragm and the exhaust flow path.

In further aspect, a turbine engine is provided including an exhaust casing, an exhaust diffuser, a relief diaphragm, wherein the relief diaphragm includes a cut away duct extending from the casing and configured to rupture during engine overpressurization conditions, and a guide system coupled within the engine between the diaphragm and an exhaust flow path extending through said exhaust casing.

DETAILED DESCRIPTION

Figure 1:
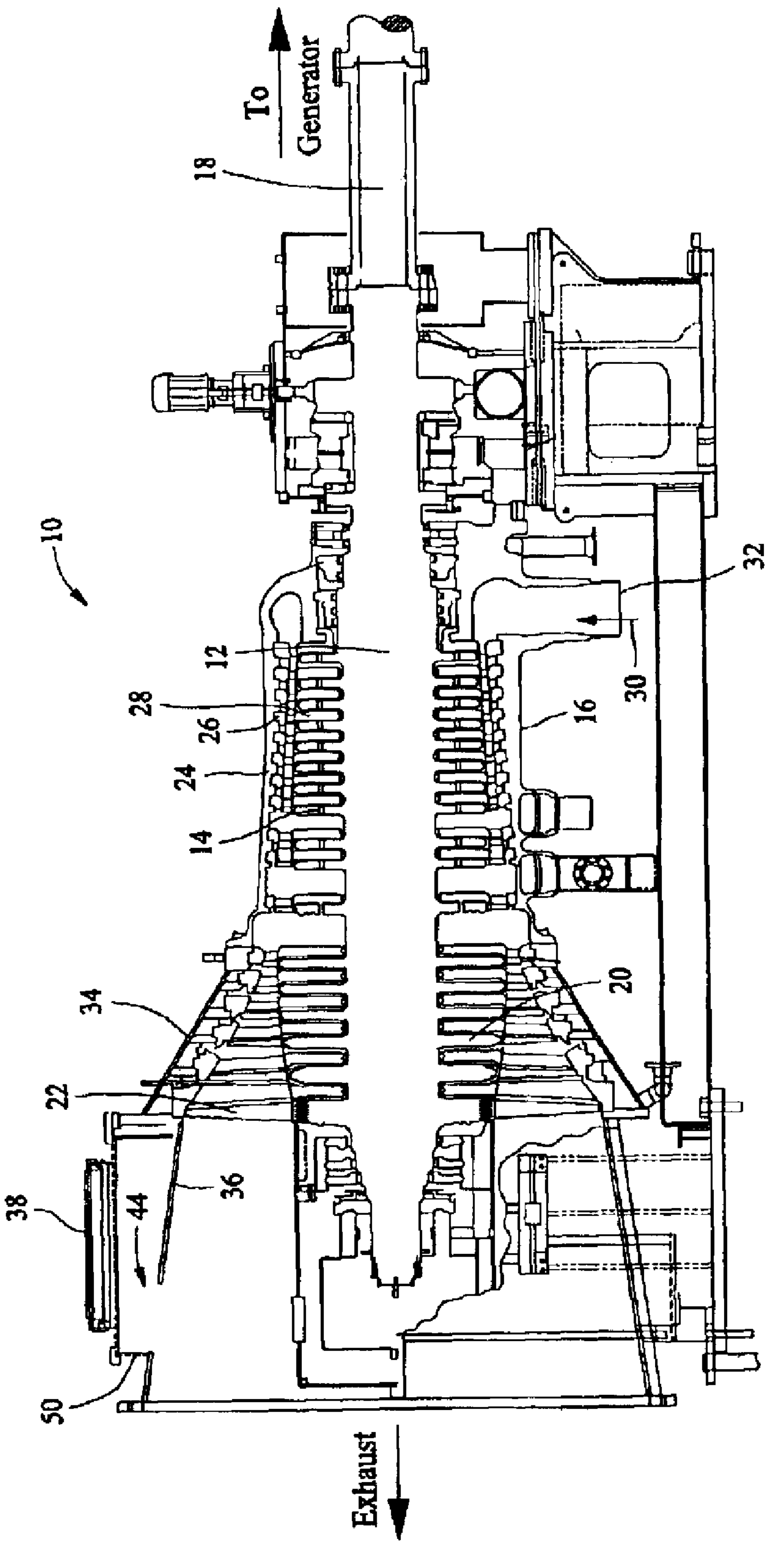
FIG. 1 is a cross-sectional view of an exemplary turbine engine.

FIG. 1 is a partial cross-sectional of an exemplary steam turbine engine 10 including a rotor assembly 12, a stator assembly 14, and a casing 16. Rotor assembly 12 includes a shaft 18 and a plurality of bucket assemblies 20. Each bucket assembly 20 includes a plurality of buckets 22 arranged in rows that extend circumferentially around shaft 18.

Stator assembly 14 includes a stator 24 and a plurality of nozzle assemblies 26. Nozzle assemblies 26 include a plurality of nozzles 28 arranged in rows that extend radially inwardly and circumferentially around stator 24. Nozzles 28 cooperate with buckets 22 to form a turbine stage and to define a portion of a steam flow path through turbine 10.

In operation, steam 30 enters an inlet 32 of turbine 10 and is channeled through nozzles 28. Nozzles 28 direct steam 30 downstream against buckets 22. Steam 30 passing through the turbine stages imparts a force on buckets 22 causing shaft 18 to rotate. Steam 30 exits turbine 10 through an exhaust casing 34 and an exhaust diffuser 36. An atmospheric relief diaphragm 38, an aperture 44, and a cut away duct 50 are positioned on diffuser 36. In the event of an exhaust overpressure condition, diaphragm 38 is configured to rupture and exhaust gases are channeled outside the turbine 10 through aperture 44, duct 50, and diaphragm 38.

At least one end of turbine 10 may extend axially away from shaft 18 and may be attached to a load or machinery (not shown), such as, but not limited to, a generator, and/or another turbine. Accordingly, a large steam turbine unit may actually include several turbines that are all co-axially coupled to the same shaft 18. Such a unit may, for example, include a high-pressure turbine coupled to an intermediate-pressure turbine, which is coupled to a low-pressure turbine. In one embodiment, steam turbine 10 is commercially available from General Electric Power Systems, Schenectady, N.Y.

Figure 2:
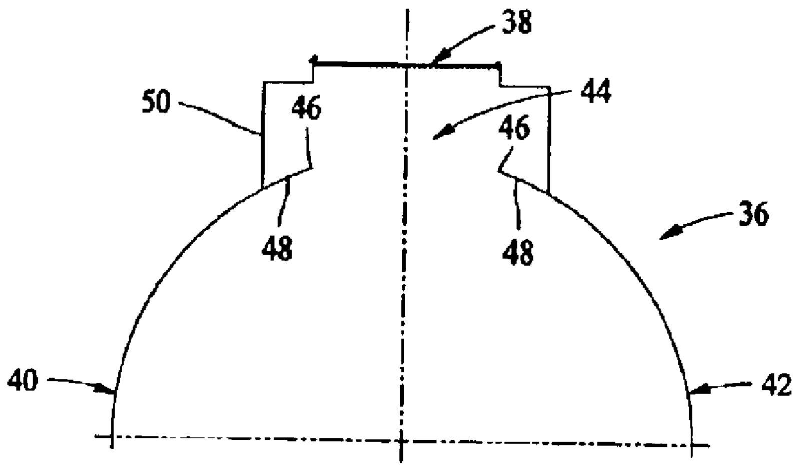
PRIOR ART FIG. 2
FIG. 2 is a cross-sectional schematic end view of a known exhaust diffuser that may be used with the turbine shown in FIG. 1.

FIG. 2 is a cross-sectional schematic end view of a known exhaust diffuser 36 that may be used with turbine engine 10. Diffuser 36 includes a first side 40 and a second side 42 that is positioned opposite from first side 40 such that an aperture 44 is defined therebetween. A ledge 46 extends substantially circumferentially into aperture 44 from an inner surface 48 of diffuser 36. An atmospheric relief diaphragm 38 is coupled to diffuser 36 such that diaphragm 38 is in flow communication with the exhaust flow path. Diaphragm 38 is known in the art, and is coupled to a cut away duct 50 extending radially outwardly from diffuser 36.

During normal operation, diaphragm 38 remains sealed and diffuser 36 channels exhaust gases axially outward from turbine engine 10. The geometry and orientation of sides 40 and 42, ledge 46, and cut away duct 50 may induce turbulence in the exhaust flow path, thereby reducing the turbine efficiency. In the event of an exhaust overpressure condition, diaphragm 38 is configured to rupture and to discharge exhaust gases through aperture 44 and from turbine 10 to facilitate reducing the peak abnormal operating pressure within diffuser 36 to an acceptable peak operating pressure.

Figure 3:
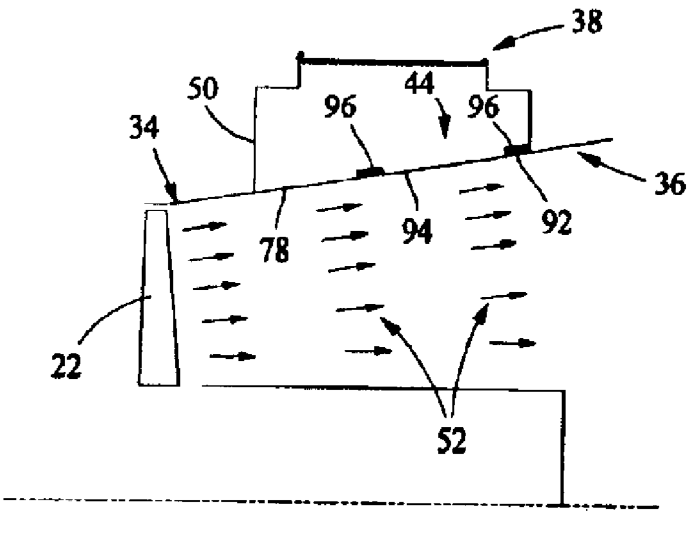
FIG. 3 is a partial cross-sectional schematic side view of an exemplary guide system that may be used with the exhaust diffuser shown in FIG. 1.
Figure 4:
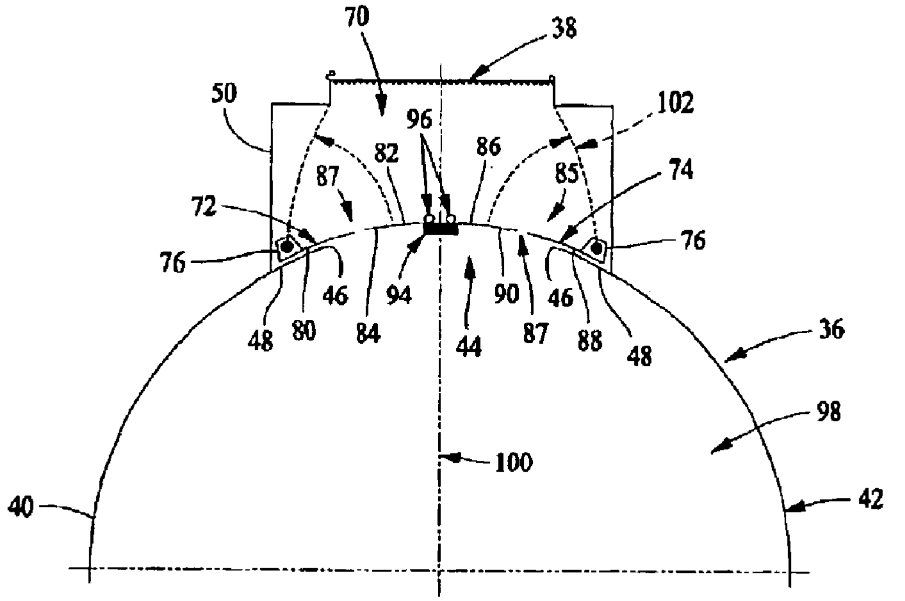
FIG. 4 is a cross-sectional schematic end view of the guide system shown in FIG. 3.

FIG. 3 is a partial cross-sectional schematic side view of exemplary guide system 70 that may be used with the upper half exhaust diffuser 36. FIG. 4 is a cross-sectional schematic end view of guide system 70. Guide system 70 includes a first guide member shell 72 and a second guide member shell 74. Member shell 74 is positioned opposite member shell 72 and each shell 72 and 74 is pivotably coupled to diffuser 36. More specifically, shells 72 and 74 are pivotably coupled to diffuser 36 by a pair of hinges 76 such that each shell 72 and 74 is rotatable from a closed position 85 to an open position 102. In an alternate embodiment, shells 72 and 74 are pivotably coupled to diffuser 36 using at least one of a spring-loaded latch, a detent mechanism, and a cable. In the exemplary embodiment, hinges 76 are mounted against diffuser ledge 46.

Member shell 72 includes a radially outer edge 80, a radially inner edge 82, and an arcuate body 84 extending therebetween. In the exemplary embodiment, shell 74 is identical to shell 72 and includes a radially inner edge 86 and a radially outer edge 88, and an arcuate body 90 extending therebetween. In an alternative embodiment, bodies 84 and 90 are substantially planar.

Guide system 70 also includes a support ledge 94 and at least one shear pin 96. Ledge 94 extends across aperture 44 between a forward diffuser ledge 78 and an aft diffuser ledge 92 such that member shells 72 and 74 are restricted from pivoting inward towards a diffuser cavity 98. In the exemplary embodiment, ledge 94 extends perpendicular to the vertical center axis 100. Member shell 72 and member shell 74 are secured in the closed position against ledge 94 by at least one shear pin 96. In the exemplary embodiment, inner edges 82 and 86 form a contact line with ledge 94 in the closed position. Cavity 98 is positioned between bodies 84 and 90 and relief diaphragm 38 in flow communication with exhaust diffuser 36 by at least one cutout 87 in bodies 84 and 90. In one embodiment, cutout 87 is substantially centered within in bodies 84 and 90. Cutout 87 is sized to permit rapid transmission of abnormal pressure to relief diaphragm 38 such that relief diaphragm 38 may rupture.

During normal operation, diaphragm 38 remains sealed, guide system 70 remains closed 85 and isolates diaphragm 38 from exhaust path flow, and diffuser 36 channels exhaust path flow axially outward from the turbine engine 10. The geometry and orientation of guide system 70 facilitates a reduced turbulent flow 52. More specifically, the geometry of first guide member shell 72 and second guide member shell 74 substantially compliment the geometry and orientation of diffuser 36 and form a continuous flow surface across aperture 44.

In the event of an exhaust overpressure condition, diaphragm 38 ruptures, pins 96 shear, and guide system 70 moves to an open position 102 such that exhaust gases from engine turbine 10 are discharged through aperture 44 and diaphragm 38 to facilitate reducing the operating pressure within diffuser 36. More specifically, during overpressure condition shear pins 96 break and first guide member shell 72 and second member shell 74 rotate into open position 102. Guide system 70 is sized to allow unimpeded flow through ruptured diaphragm 38. In the exemplary embodiment, diaphragm 38 is configured to rupture when the pressure inside the exhaust casing exceeds approximately 15 psig. In the another embodiment, diaphragm 38 is configured to rupture when the pressure inside the exhaust casing exceeds approximately 1 psig.

The above-described guide system is performance enhancing and efficient. The guide system increases the aerodynamic qualities of the exhaust diffuser by reducing the flow variations and losses induced by the cut away ducts, thus facilitating the reduction of exhaust flow turbulence and increasing engine efficiency. As a result, the guide system significantly improves the performance of the turbine and increases operating efficiency in a cost-effective manner.

Exemplary embodiments of the guide system are described above in detail. The systems are not limited to the specific embodiments described herein, but rather, components of the guide system may be utilized independently and separately from other components described herein. Each guide system component can also be used in combination with other guide system and turbine components.

While the invention has been described in terms of various specific embodiments, those skilled in the art will recognize that the invention can be practiced with modification within the spirit and scope of the claims.

What is claimed is:

1. A method for assembling a turbine engine including an exhaust diffuser extending aftward from an exhaust casing, said method comprising:

coupling a relief diaphragm to the exhaust diffuser; and pivotably coupling a guide system to the exhaust diffuser such that the guide system is radially inward from the relief diaphragm and defines at least a portion of the exhaust flow path through the exhaust diffuser, and such that a first guide member shell is opposite a second guide member shell.

2. A method in accordance with claim 1 wherein coupling a guide system to the exhaust diffuser further comprises coupling the first guide member shell and the second guide member shell to the exhaust diffuser such that each guide member shell engages a ledge positioned between the first and second guide member shells.

3. A method in accordance with claim 1 wherein coupling a guide system to the exhaust diffuser further comprises coupling the guide system to the exhaust diffuser such that during normal operating conditions the relief diaphragm is substantially isolated from the exhaust flow path.

4. A method in accordance with claim 1 wherein coupling a guide system to the exhaust diffuser further comprises coupling the guide system to the exhaust diffuser such that during normal operating conditions the guide system forms a substantially continuous flow surface.

5. A method in accordance with claim 1 wherein coupling a guide system to the exhaust diffuser further comprises coupling the guide system to the exhaust diffuser such that the relief diaphragm is rupturable during engine overpressure operating conditions.

6. A turbine engine comprising:

an exhaust casing defining a portion of an exhaust flow path therethrough;

an exhaust diffuser coupled to said exhaust casing;

a relief diaphragm coupled to said exhaust diffuser; and a guide system comprising a first guide member shell pivotably coupled to said exhaust diffuser such that said guide system is radially inward from said relief diaphragm and between said relief diaphragm and the exhaust flow path, said guide system further comprising a second guide member shell pivotably coupled to said exhaust diffuser, said first guide member shell opposite said second guide member shell.

7. A turbine engine in accordance with claim 6 wherein said guide system is moveable from a closed position based on an abnormal operating pressure that exceeds atmospheric pressure and reaches a peak pressure of typically 15 psig or less.

8. A turbine engine in accordance with claim 6 wherein said guide system forms a substantially continuous flow surface facilitating the reduction of flow path turbulence within said exhaust diffuser.

9. A turbine engine in accordance with claim 6 wherein said guide system substantially isolates said relief diaphragm from the exhaust flow path during normal operating engine operations.

10. A turbine engine in accordance with claim 6 wherein said guide system is pivotably coupled to said exhaust diffuser by at least one of a hinge, a spring-loaded latch, a detent mechanism, and a cable.

11. A turbine engine comprising an exhaust casing, an exhaust diffuser, a relief diaphragm, said relief diaphragm comprising a cut away duct extending from said casing and configured to rupture during engine overpressurization conditions, and a guide system coupled within said engine between said diaphragm and an exhaust flow path extending through said exhaust casing, wherein said guide system defines at least a portion of the exhaust flow path, and said guide system comprises a first guide member shell coupled to said exhaust diffuser by a shear pin, and a second guide member shell coupled to said exhaust diffuser by a shear pin, said second guide member shell opposite said first guide member shell.

12. A turbine engine in accordance with claim 11 wherein said first guide member and said second guide member are moveable from a closed position to an open position.

13. A turbine engine in accordance with claim 11 wherein said guide system forms a substantially continuous flow surface facilitating the reduction of flow path turbulence within said exhaust diffuser.

14. A turbine engine in accordance with claim 11 wherein said first and said second guide member shells substantially isolate said relief diaphragm from said exhaust flow path during normal operating conditions.

15. A turbine engine in accordance with claim 11 wherein said first and second guide member shells pivotably engage a ledge positioned between said first and said second guide member shells.

16. A turbine engine in accordance with claim 11 wherein said first and said second guide member shells are each pivotably coupled to said exhaust diffuser by at least one of a hinge, a spring-loaded latch, a detent mechanism, and a cable.

17. A turbine engine in accordance with claim 11 wherein said first guide member and said second guide member are coupled to a support ledge by at least one shear pin.

* * * * *